(12) United States Patent
Han

(10) Patent No.: US 12,738,032 B2
(45) Date of Patent: Sep. 15, 2026

(54) TRAINING DATA SPLITTING METHOD AND ELECTRONIC DEVICE

(71) Applicant: Acer Incorporated, New Taipei City (TW)

(72) Inventor: Chun-Lin Han, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 293 days.

(21) Appl. No.: 18/640,011

(22) Filed: Apr. 19, 2024

(65) Prior Publication Data

US 2025/0252718 A1 Aug. 7, 2025

(30) Foreign Application Priority Data

Feb. 6, 2024 (TW) ................................ 113104573

(51) Int. Cl.

| | |
|---|---|
| ***G06V 10/774*** | (2022.01) |
| ***G06V 10/74*** | (2022.01) |
| ***G06V 10/764*** | (2022.01) |
| ***G06V 10/77*** | (2022.01) |
| ***G06V 10/776*** | (2022.01) |

(52) U.S. Cl.

CPC ........ *G06V 10/7747* (2022.01); *G06V 10/761* (2022.01); *G06V 10/765* (2022.01); *G06V 10/7715* (2022.01); *G06V 10/776* (2022.01)

(58) Field of Classification Search

None

See application file for complete search history.

(56) References Cited

U.S. PATENT DOCUMENTS

| | | | | |
|---|---|---|---|---|
| 12,586,360 | B1 * | 3/2026 | Matthews | G06V 10/776 |
| 2018/0181808 | A1 * | 6/2018 | Sridharan | G06V 30/19173 |
| 2020/0019890 | A1 * | 1/2020 | Rossi | G06F 11/3452 |
| 2020/0380088 | A1 * | 12/2020 | Sha | G06N 3/088 |
| 2021/0232911 | A1 * | 7/2021 | Velagapudi | G06F 40/20 |
| 2022/0012872 | A1 * | 1/2022 | Gilboa-Solomon | G06F 16/90332 |
| 2022/0067738 | A1 * | 3/2022 | Fang | G06Q 20/389 |

(Continued)

FOREIGN PATENT DOCUMENTS

| | | |
|---|---|---|
| CN | 115482437 | 12/2022 |
| CN | 117437522 | 1/2024 |

(Continued)

OTHER PUBLICATIONS

Li et al. ("Unlabeled data selection for active learning in image classification", Scientific Reports, vol. 14, Article No. 424 Jan. 2024) (Year: 2024).*

*Primary Examiner* — Randolph I Chu
(74) *Attorney, Agent, or Firm* — JCIPRNET

(57) ABSTRACT

The disclosure provides a training data splitting method and an electronic device. The method includes the following steps. Training data including a plurality of training images is obtained. A plurality of feature vectors of the training images are obtained by using an encoder of a pre-trained model. Feature similarity between any two of the feature vectors is evaluated. A plurality of target training images are selected from the training images based on feature similarities associated with each feature vector. The training data is split into a training set including the target training image and a verification set, wherein the training set and the verification set are utilized to train a machine learning model.

18 Claims, 9 Drawing Sheets

(56) References Cited

U.S. PATENT DOCUMENTS

| | | | | |
|---|---|---|---|---|
| 2022/0101068 | A1* | 3/2022 | Zlotnick | G06F 18/2433 |
| 2022/0277232 | A1* | 9/2022 | Jones | G06N 3/08 |
| 2023/0034012 | A1* | 2/2023 | Sato | G06F 16/9035 |

FOREIGN PATENT DOCUMENTS

| | | | | |
|---|---|---|---|---|
| CN | 120707978 A | * | 9/2025 | G06V 10/764 |
| TW | 202301380 | | 1/2023 | |

* cited by examiner

TRAINING DATA SPLITTING METHOD AND ELECTRONIC DEVICE

CROSS-REFERENCE TO RELATED APPLICATION

This application claims the priority benefit of Taiwan application serial no. 113104573, filed on Feb. 6, 2024. The entirety of each of the above-mentioned patent applications is hereby incorporated by reference herein and made a part of this specification.

BACKGROUND

Technical Field

The disclosure relates to a training method for a deep learning model, and in particular, to a training data splitting method and an electronic device.

Description of Related Art

During the training process of a machine learning model, the training data is usually divided into three parts: Training Set, Validation Set and Test Set. First, the training set is the main source of model learning, which is utilized to train the weights and parameters of the model. Through the training set, the machine learning model may learn patterns, features and predictive capabilities in the data. Secondly, the validation set is utilized to adjust the hyperparameters of the model to avoid overfitting to the training data. In this process, the performance of the machine learning model is evaluated on the validation set, and its architecture or parameters are adjusted based on the results to improve generalization performance. This helps ensure that the model performs more robustly on unseen data. Finally, the test set is utilized to evaluate the performance of the model in real application scenarios. The test set is something that the machine learning model has never seen during the training process, so it may provide an objective evaluation and reflect the generalization ability of the model. Testing the machine learning model by the test set ensures that it may achieve the expected performance in real applications and verifies whether it meets the requirements of the project. In general, the training set is used for model learning, the validation set is used for adjusting parameters, and the test set is used for final performance evaluation. This method of segmenting data helps ensure the reliability and generalization ability of machine learning models, making them more trustworthy in real applications.

Currently, the existing methods of segmenting datasets are mostly based on random sampling. However, when the training data includes a small number of training samples with unique characteristics, the data segmentation method using random sampling may cause the small number of training samples not to be summarized into the training set. As a result, the machine learning model will be unable to perform machine learning based on the unique characteristics of the small number of training samples, thereby reducing the robustness and generalization of the model. In particular, for machine learning in the medical field, medical images with unique disease characteristics are often rare and difficult to obtain.

SUMMARY

The disclosure provides a training data splitting method and an electronic device, which may solve the above technical problems.

The disclosure provides a training data splitting method, which includes the following steps. Training data that includes a plurality of training images is obtained. A plurality of feature vectors of the training images are obtained by using an encoder of a pre-trained model. A feature similarity between any two of the feature vectors is evaluated. A plurality of target training images is selected from the training images according to the feature similarities associated with each of the feature vectors. The training data is split into a training set including the target training images and a validation set, wherein the training set and the validation set are utilized to train the machine learning model.

The disclosure provides an electronic device, which includes a storage device and a processor. The storage device is configured to store program code. The processor is coupled to the storage device and configured to accesses program code to perform the following operations. Training data that includes a plurality of training images is obtained. A plurality of feature vectors of the training images are obtained by using an encoder of a pre-trained model. A feature similarity between any two of the feature vectors is evaluated. A plurality of target training images is selected from the training images according to the feature similarities associated with each of the feature vectors. The training data is split into a training set including the target training images and a validation set, wherein the training set and the validation set are utilized to train the machine learning model.

Based on the above, in the embodiment of the disclosure, the encoder of the pre-trained model may first be utilized to obtain the corresponding feature vector of each training image, and the feature similarities between each feature vector and other feature vectors may be calculated. Based on the feature similarities between each feature vector and other feature vectors, multiple target training images that may have unique characteristics are selected from multiple training images. Based on this, by incorporating the target training images into the training set, the data diversity of the training set may be increased to improve the generalization ability of the machine learning model.

DESCRIPTION OF THE EMBODIMENTS

Some embodiments of the disclosure will be described in detail with reference to the accompanying drawings. The component symbols cited in the following description will be regarded as the same or similar components when the same component symbols appear in different drawings. The embodiments are only part of the disclosure and do not disclose all possible implementations of the disclosure. Rather, the embodiments are only examples of methods and apparatuses within the scope of the patent application of the disclosure.

Figure 1:
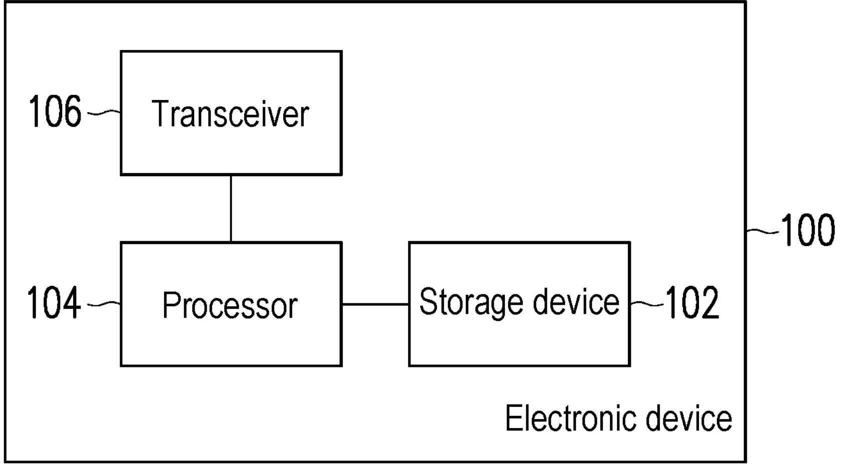
FIG. 1 is a schematic diagram of an electronic device according to an embodiment of the disclosure.

Referring to FIG. 1, which is a schematic diagram of an electronic device according to an embodiment of the disclosure. In different embodiments, the electronic device 100 may be, for example, various computer devices, server devices, or combinations thereof, but is not limited thereto. As shown in FIG. 1, the electronic device 100 may include a transceiver 106, a storage device 102 and a processor 104.

The storage device 102 may be, for example, any type of fixed or removable random access memory (RAM), read-only memory (ROM), Flash memory, hard disk or other similar device, or a combination of such devices, which may be configured to record programing code or software modules.

The transceiver 106 may transmit and receive signals wirelessly or wired. The transceiver 106 may also perform operations such as low noise amplification, impedance matching, mixing, up or down frequency conversion, filtering, amplification, and similar operations. The transceiver 106 may be configured to receive data from external devices.

The processor 104 is coupled to the storage device 102 and the transceiver 106, and may be a general purpose processor (e.g. CPU), a special purpose processor, a traditional processor, a digital signal processor, a plurality of microprocessors, or one or more microprocessors combined with a digital signal processor core. processor, controller, microcontroller, Application Specific Integrated Circuit (ASIC), Field Programmable Gate Array (FPGA), any other kind of integrated circuit, state machine, based on Advanced RISC Machine (ARM) processors or similar products.

In an embodiment of the disclosure, the processor 104 may access the software modules, program code or instructions recorded in the storage device 102 to implement the training data splitting method proposed by the disclosure, the details of which are described in detail below.

Figure 2:
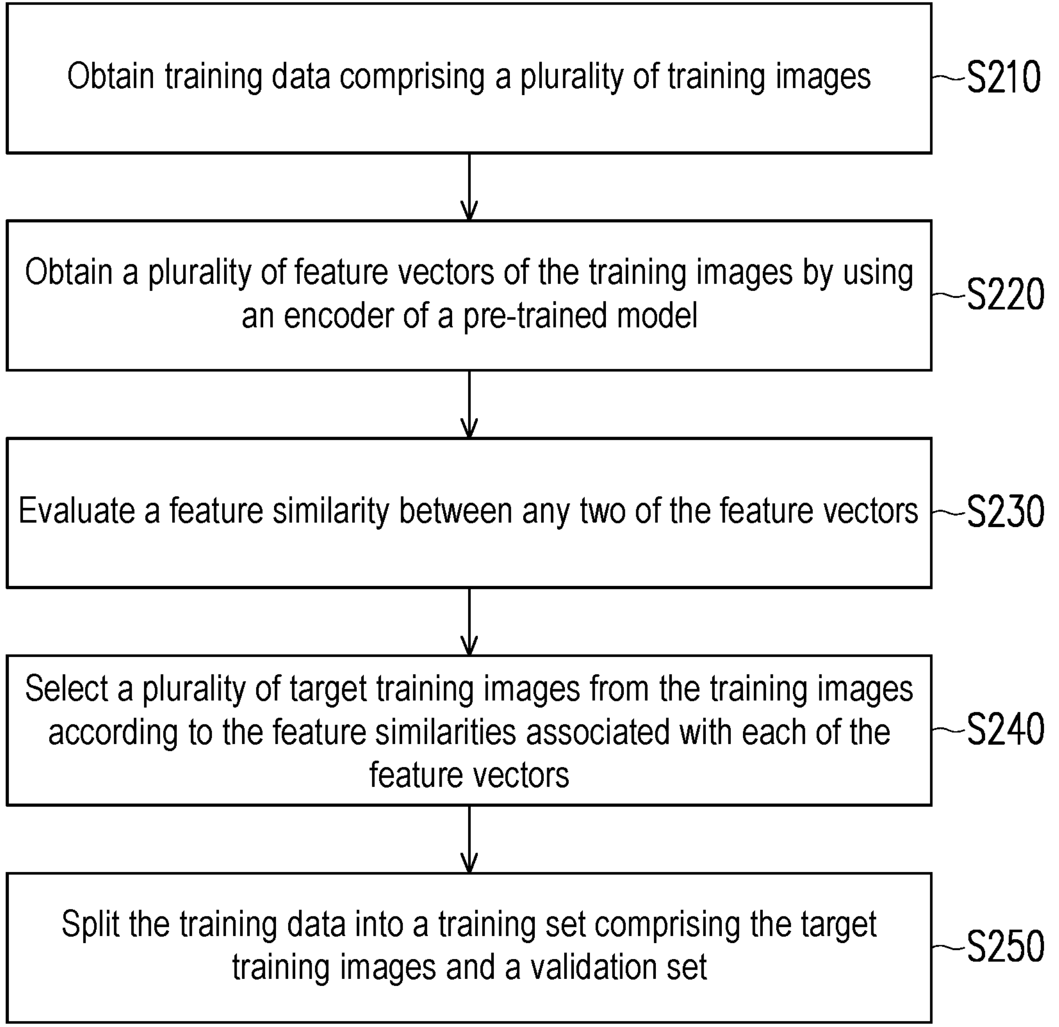
FIG. 2 is a flowchart of a training data splitting method according to an embodiment of the disclosure.

Referring to FIG. 2, which is a flowchart of a training data splitting method according to an embodiment of the disclosure. The method of the embodiment is applicable to the electronic apparatus 100 in the above embodiment. The following describes detailed steps of the embodiment in connection with various elements in the electronic apparatus 100.

First, in step S210, the processor 104 may obtain training data including a plurality of training images. The training data is utilized to train a machine learning model. This machine learning model is, for example, U-Net model, Fully Convolutional Networks (FCN) model, SegNet model, Mask R-CNN model, Generative Adversarial Network (GAN) model or Transformer model, and so on, the disclosure is not limited to this. From another point of view, the machine learning model may be a classification model or an image segmentation model, and the disclosure is not limited to this. In different embodiments, the training data may include a plurality of labeled or unlabeled training images.

In step S220, the processor 104 may obtain a plurality of feature vectors of the training images by using an encoder of a pre-trained model. In some embodiments, the pre-trained model is established based on machine learning using a Self-Supervised Learning (SSL) algorithm. Pre-trained models may be pre-trained by using large-scale image datasets to learn common features in images. After the pre-trained process is accomplished, the pre-trained model may be fine-tuned to suit specific applications such as object detection, image classification, image generation, etc. In the embodiment of the disclosure, the pre-training model may include an encoder and an encoder. The processor 104 uses the encoder to obtain a feature vector corresponding to each training image.

Figure 3:
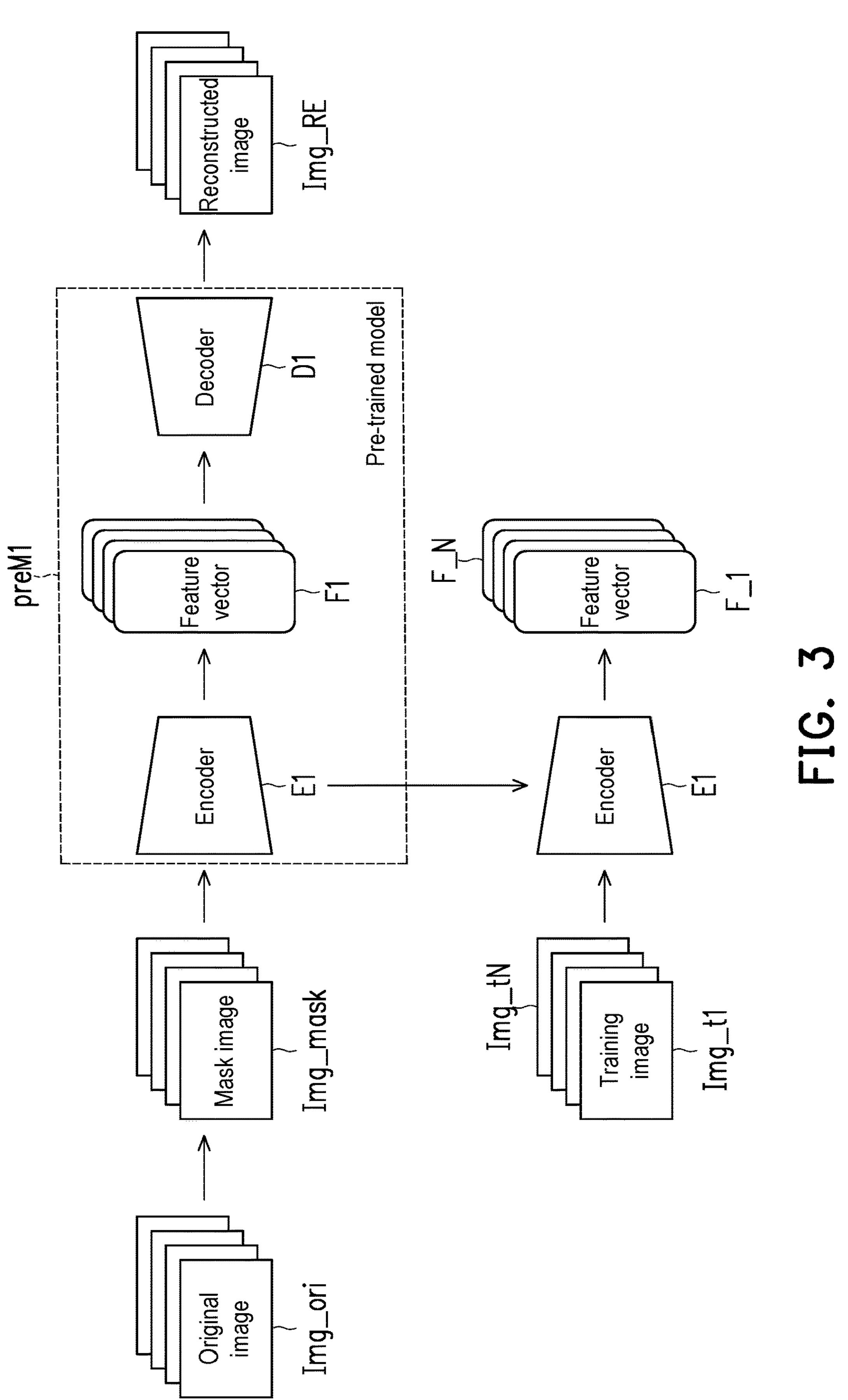
FIG. 3 is a schematic diagram of a pre-trained model according to an embodiment of the disclosure.

To make the concept of this operation easier to understand, FIG. 3 is used for further explanation below. Referring to FIG. 3, which is a schematic diagram of a pre-trained model according to an embodiment of the disclosure. During the pre-training process of the pre-training model preM1, the processor 104 may first collect a large number of unlabeled original images Img_ori. Next, for each unlabeled original image Img_ori, the processor 104 may mask a part of the original image Img_ori to generate a corresponding mask image Img_mask. The training goal of the pre-trained model preM1 is to correctly predict the occluded areas to restore the image content. Based on this, the processor 104 inputs the mask images Img_mask to the pre-trained model preM1 to generate the corresponding reconstructed image Img_Re, and may calculate the loss value based on the reconstructed image Img_Re and adjust the model parameters of the pre-trained model preM1 according to the loss value. The processor 104 may, for example, calculate the above loss value based on the L1 loss function, L2 loss function, or adversarial loss (Adversarial Loss) function, but is not limited thereto. In some embodiments, the pre-trained model preM1 may be, for example, a masked autoencoder (MAE) model. In some embodiments, the relevant details of the pre-trained model preM1 and encoder E1 may refer to relevant technical documents (for example, a retinal basic model named RETFound published in the journal "Nature" in September 2023).

In more detail, the pre-trained model preM1 may include encoder E1 and decoder D1. In the pre-training stage, each mask image Img_mask is input to encoder E1 one by one, and encoder E1 may extract the corresponding feature vector F1 from each mask image Img_mask respectively. Decoder D1 may generate the corresponding reconstructed image Img_RE according to each feature vector F1.

As shown in FIG. 3, in the embodiment of the disclosure, when the pre-training phase is completed, decoder D1 is no longer needed, and the trained encoder E1 may be used as a feature extractor to generate N feature vector F_1 to F_N of N training images Img_t1 to Img_tN. In more detail, the processor 104 may input the N training images Img_t1 to Img_tN to the encoder E1 one by one, and generate N feature vectors F_1 to F_N in sequence.

Please return to FIG. 2. In step S230, the processor 104 may evaluate a feature similarity between any two of the feature vectors. For example, the processor 104 may calculate the cosine similarity, Euclidean Distance, or Manhattan Distance between a feature vector and another feature vector to generate one feature similarity between the two feature vectors. In some embodiments, the processor 104 may calculate multiple feature similarities between each feature vector and all other feature vectors.

In step S240, the processor 104 may select a plurality of target training images from the training images according to the feature similarities associated with each of the feature vectors. Based on the feature similarities between each feature vector and other feature vectors, the processor 104 may identify outlier feature vectors with significant difference compared to most feature vectors. Therefore, the processor 104 may select the target training images corresponding to the outlier feature vectors from the training images.

Specifically, the target training images respectively corresponding to the outlier feature vectors may have relatively unique image characteristics, so the processor 104 may incorporate the target training images to the training set to increase the data diversity of the training set.

In step S250, the processor 104 may split the training data into a training set including the target training images and a validation set, wherein the training set and the validation set are utilized to train the machine learning model.

Figure 4:
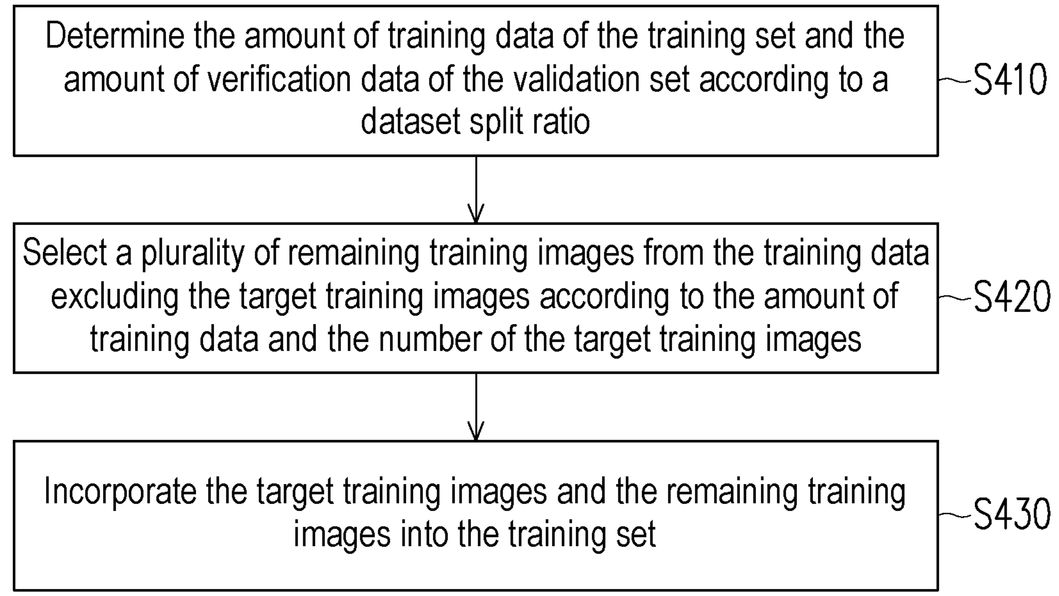
FIG. 4 is a flowchart of splitting a training set and a validation set according to an embodiment of the disclosure.

Referring to FIG. 4, which is a flowchart of splitting a training set and a validation set according to an embodiment of the disclosure. In some embodiments, step S250 may be implemented as step S410 to step S430.

In step S410, the processor 104 may determine an amount of training data of the training set and an amount of verification data of the validation set according to a dataset split ratio. For example, the dataset split ratio between the training set and the validation set may be 7:3, 8:2, or 9:1, but it is not limited thereto. That is, the ratio between the amount of training data in the training set and the amount of verification data in the validation set is 7:3, 8:2, or 9:1. However, the dataset split ratio may be set according to actual applications, and the disclosure is not limited to this.

In step S420, the processor 104 may select a plurality of remaining training images from the training data excluding the target training images according to the amount of training data and the number of the target training images. In step S430, the processor 104 may incorporate the target training images and the remaining training images into the training set.

For example, assuming that the training data includes 1000 training images, the processor 104 may determine the amount of training data in the training set to be 700 images and the amount of verification data in the validation set to be 300 images based on the dataset split ratio. Therefore, assuming that the processor 104 may obtain 100 target training images based on the feature similarities associated with each feature vector, the processor 104 may randomly sample 600 remaining training images from the training data excluding the 100 target training images (that is, 900 training images). The processor 104 may add 100 target training images and 600 remaining training images to the training set, and add 300 training images that are not randomly sampled to the validation set.

However, in other embodiments, the processor 104 may perform random sampling to randomly select multiple verification training images from the training data excluding the target training images based on the amount of verification data and the number of the target training images. Then, the processor 104 may add the verification training images to the validation set. In addition, the processor 104 may add training images that are not randomly sampled and target training images to the training set.

Figure 5:
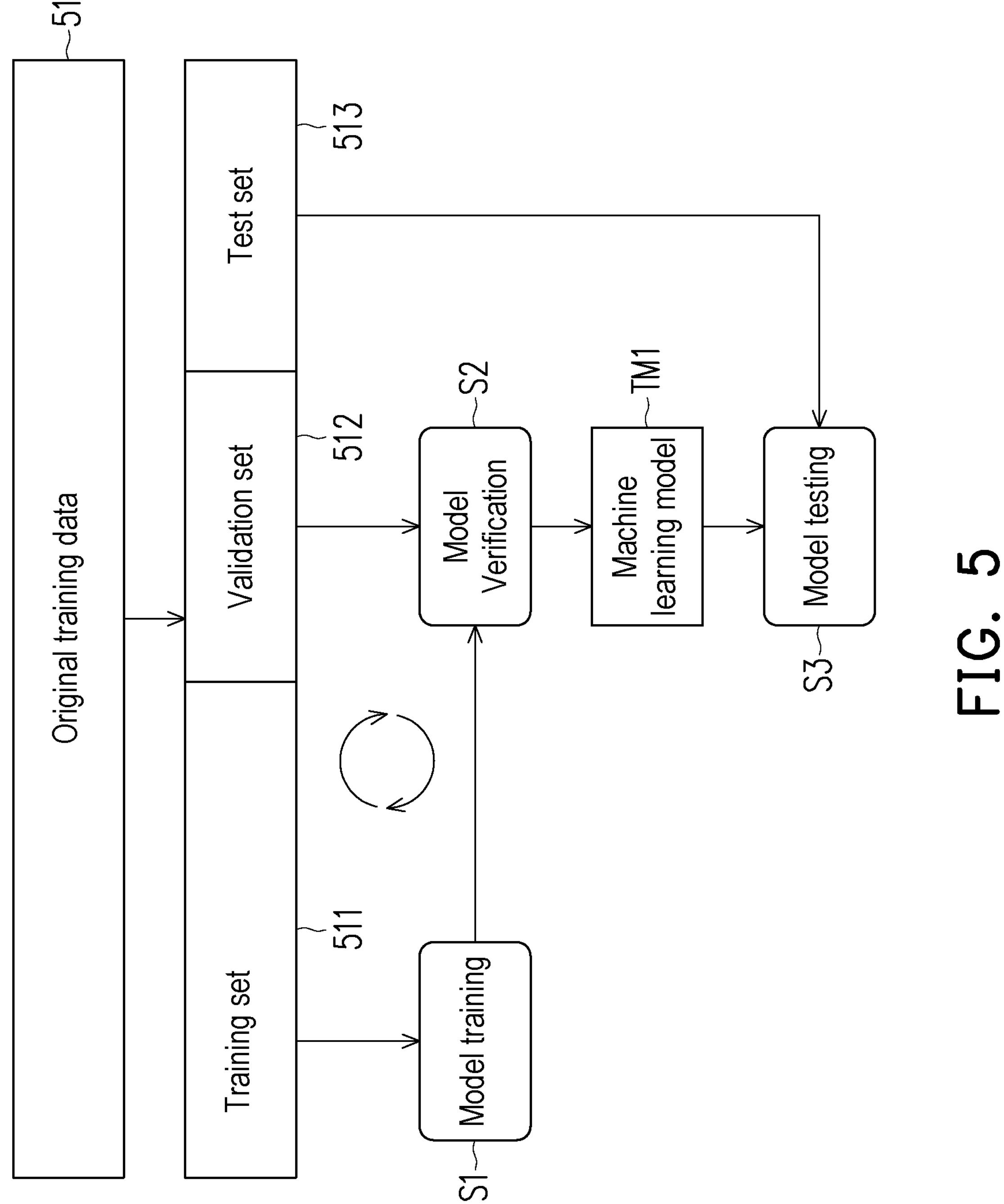
FIG. 5 is a schematic diagram of training a machine learning model according to an embodiment of the disclosure.

Referring to FIG. 5, which is a schematic diagram of training a machine learning model according to an embodiment of the disclosure. The processor 104 may first randomly sample the test set 513 from the original training data 51. In some embodiments, the processor 104 may perform stratified sampling to obtain the test set 513, that is, the processor 104 may conduct random sampling separately for training data of different sample categories. Then, the processor 104 may determine the training set 511 and the validation set 512 according to the relevant operations of the embodiments. Based on this, the original training data 51 may be split by the processor 104 into a training set 511, a validation set 512 and a test set 513.

In operation S1, the processor 104 may use the training set 511 and the machine learning algorithm to perform model training. In some embodiments, the processor 104 may perform backpropagation on the machine learning model according to the loss value, thereby adjusting the model parameters of the machine learning model according to the Gradient Descent algorithm. In operation S2, the processor 104 may use the validation set 512 to perform model validation on the trained machine learning model, and adjust hyperparameters (such as learning rate, convolution kernel size or number of convolution kernels, etc.) to improve model performance. The processor 104 may use the training set 511 and the validation set 512 to repeatedly perform operations S1 and S2 until the model performance of the final machine learning model TM1 meets the requirements. Furthermore, each time the processor 104 may use the validation set 512 to perform model validation on the trained machine learning model, and obtain some evaluation indicators (for example: Accuracy or F1-score, etc.). Afterwards, the processor 104 may determine the final machine learning model TM1 based on the evaluation indicators generated each time the model is verified. Finally, the processor 104 may use the test set 513 to test the machine learning model TM1 to finally evaluate the generalization performance of the machine learning model TM1.

It should be noted that, in the embodiment of the disclosure, since the processor 104 may use the training set 511 including target training images to perform model training, the model training may be performed based on relatively unique image features, thereby improving the model generalization ability.

Figure 6:
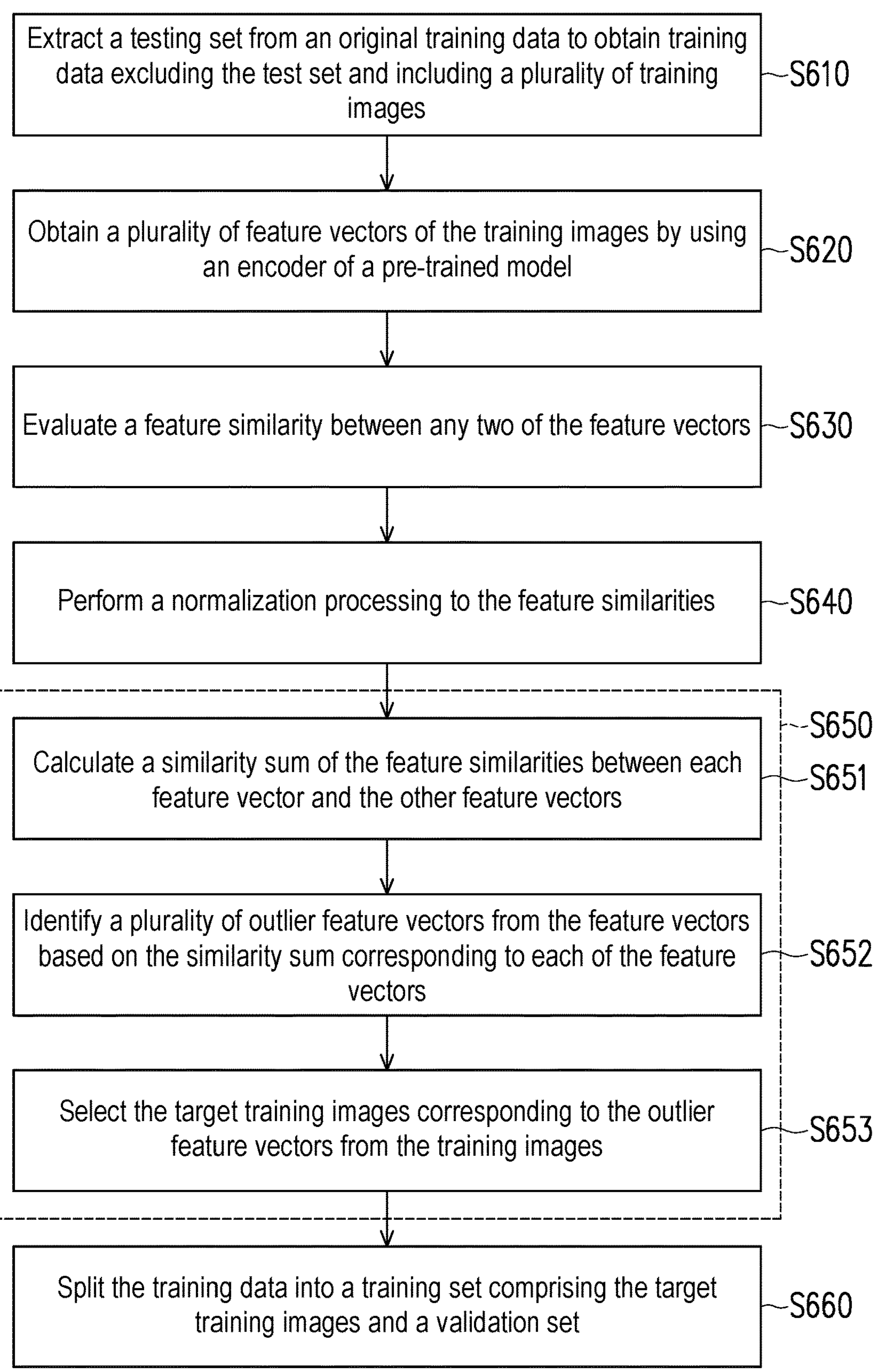
FIG. 6 is a flowchart of a training data splitting method according to an embodiment of the disclosure.

Referring to FIG. 6, which is a flowchart of a training data splitting method according to an embodiment of the disclosure. The method of this embodiment may be executed by the electronic device 100 in FIG. 1. The details of each step in FIG. 6 will be described below with reference to the components shown in FIG. 1.

First, in step S610, the processor 104 may extract a testing set from the original training data to obtain training data that excludes the test set and includes multiple training images. In step S620, the processor 104 may use the encoder of a pre-trained model to obtain a plurality of feature vectors of a plurality of training images. In step S630, the processor 104 may evaluate the feature similarity between any two of the feature vectors. Relevant details of the steps may refer to the foregoing embodiments and will not be described again here.

In step S640, the processor 104 may perform a normalization process to the feature similarities. Specifically, the processor 104 may normalize the feature similarities to be within a specific numerical range. For example, the processor 104 may normalize the feature similarities to be between 0 and 1.

In some embodiments, each feature similarity is inversely correlated with the degree of similarity between the two feature vectors. That is, the smaller the feature similarity, the more similar the two feature vectors are. On the contrary, the greater the feature similarity, the more different the two feature vectors are. In some embodiments, when the processor 104 uses cosine similarity to calculate the feature similarities between any two of the feature vectors, the processor 104 may normalize the feature similarity according to the following equation (1).

$$\text{Feature similarity} = \frac{1 - \cos\theta}{2} \quad \text{equation (1)}$$

wherein, cos θ is the cosine similarity between the two feature vectors, which ranges from −1 to 1.

In step S650, the processor 104 may select the target training images from the training images based on the feature similarities associated with each feature vector. Here, step S650 may be implemented as steps S651 to step S653.

In step S651, the processor 104 may calculate a similarity sum of the feature similarities between each feature vector and the other feature vectors. To make the concept of this operation easier to understand, FIG. 7 will be used for further explanation below. Please refer to FIG. 7, which is a schematic diagram of obtaining the similarity sum according to an embodiment of the disclosure.

Figure 7:
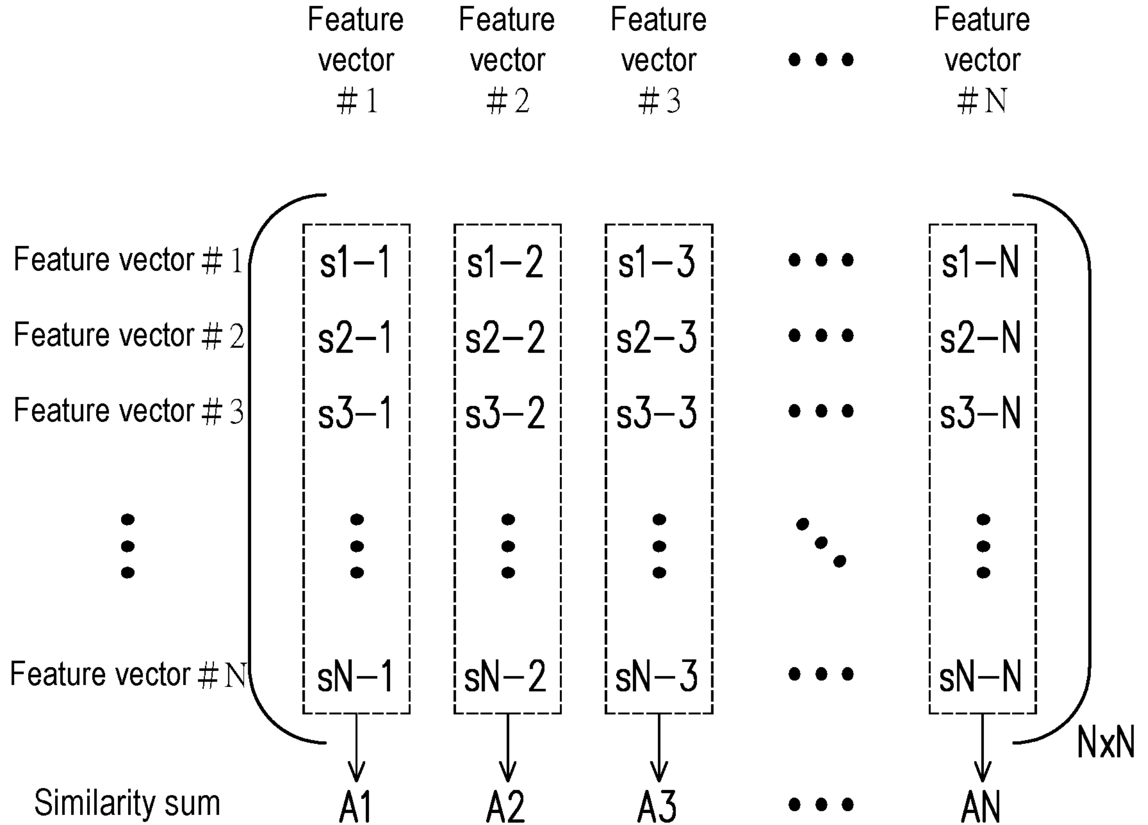
FIG. 7 is a schematic diagram of obtaining the similarity sums according to an embodiment of the disclosure.

Assuming that the processor 104 may obtain training data including N training images. Therefore, the processor 104 may obtain N feature vectors #1 to #N of N training images by using the encoder of the pre-trained model. The processor 104 may calculate the feature similarities s2-1, s3-1, . . . , sN-1 between feature vector #1 and other feature vectors #2 to #N. In addition, the processor 104 may calculate the similarity s1-1 between feature vector #1 and itself. Then, the processor 104 may calculate the feature similarities s1-2, s3-2, . . . , sN-2 between feature vector #2 and other feature vectors #1, #3 to #N. In addition, the processor 104 may calculate the similarity s2-2 between feature vector #2 and itself. It may be seen that based on Euclidean distance or cosine similarity, the feature similarities s1-1 and s2-2 are 0. Repeat the above operation of calculating feature similarities for feature vector #3~#N, and the processor 104 may obtain the feature similarity matrix (N×N) as shown in FIG. 7. Each matrix element of the feature similarity matrix represents the feature similarity between the two feature vector #1 to #N.

Then, the processor 104 may sum up all matrix elements of a column corresponding to feature vector #1 to obtain the similarity sum A1 corresponding to the feature vector #1. Similarly, the processor 104 may sum up all matrix elements of a column corresponding to feature vector #2 to obtain the similarity sum A2 corresponding to the feature vector #2. According to the similar operation mode, the processor 104 may obtain the similarity sums A3 to AN corresponding to the feature vectors #3 to #N respectively.

In step S652, the processor 104 may identify the outlier feature vectors from the feature vectors based on the similarity sum corresponding to each feature vector. As shown in FIG. 7, N feature vectors #1 to #N respectively correspond to N similarity sums A1 to AN.

In some embodiments, the processor 104 may sort the similarity sum corresponding to each feature vector, and determine the outlier feature vectors based on the sorting results. For example, some feature vectors corresponding to the top ranked similarity sums may be identifies as the outlier feature vectors.

In some embodiments, the comparing result between the similarity sum of each outlier feature vector with a threshold value meets the outlier condition. In some embodiments, the outlier condition is that the similarity sum is greater than a threshold. In other words, when a similarity sum corresponding to a certain feature vector is greater than the threshold, the processor 104 will identify the certain feature vector as an outlier feature vector.

Figure 8:
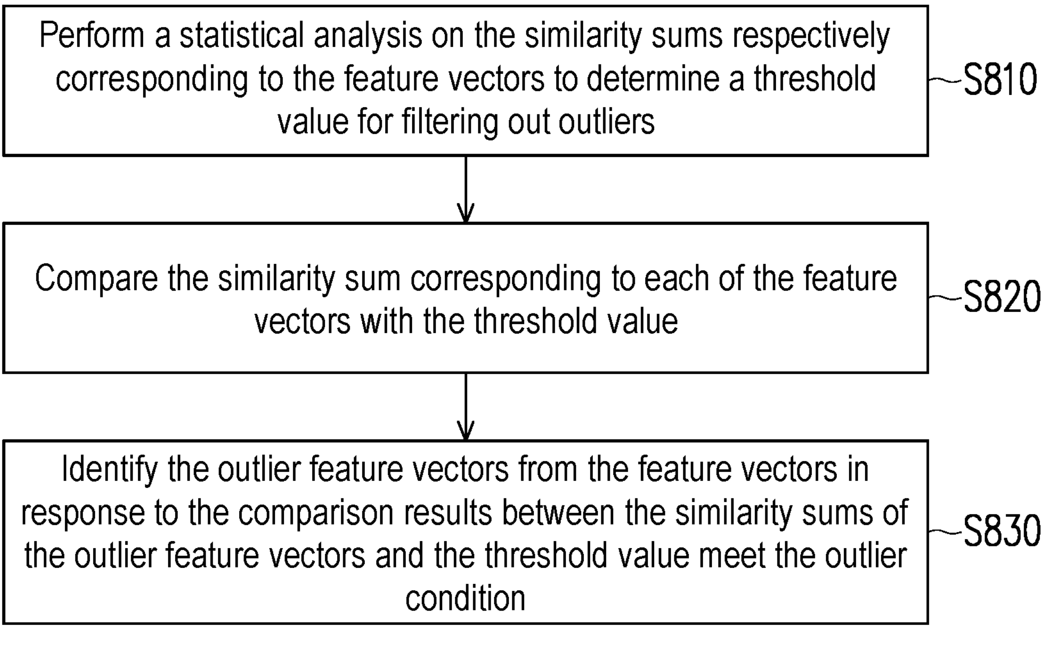
FIG. 8 is a flowchart of identifying multiple outlier feature vectors according to an embodiment of the disclosure.

Referring to FIG. 8, which is a flowchart of identifying multiple outlier feature vectors according to an embodiment of the disclosure. In some embodiments, step S652 may be implemented as step S810 to step S830.

In step S810, the processor 104 may performs a statistical analysis on the similarity sums respectively corresponding to the feature vectors to determine a threshold value for filtering out outliers. In some embodiments, the processor 104 may calculate the first quartile (Q1) and the third quartile (Q3) of the similarity sums respectively corresponding to the feature vectors, and determine the interquartile range (IQR) according to the difference between the first quartile (Q1) and the third quartile (Q3). Afterwards, the processor 104 may determine the threshold value according to the following equation (2).

$$\text{Threshold value} = Q3 + 1.5 * IQR \qquad \text{equation (2)}$$

In step S820, the processor 104 may compare the similarity sum corresponding to each feature vector with the threshold value. In some embodiments, the processor 104 may determine whether the similarity sum corresponding to each feature vector is greater than the threshold value.

In step S830, the processor 104 may identify the outlier feature vectors from the feature vectors in response to the comparison results between the similarity sums of the outlier feature vectors and the threshold value meet the outlier condition. In some embodiments, if the similarity sum corresponding to a certain feature vector is greater than the threshold, the comparison result meets the outlier condition, and the certain feature vector may be identified as an outlier feature vector.

Please return to FIG. 6. In step S653, the processor 104 may select the target training images corresponding to the outlier feature vectors from the training images. Afterwards, in step S660, the processor 104 may split the training data into a training set including multiple target training images and a validation set. For detailed description of this step, please refer to the foregoing embodiments and will not be described again here.

It should be noted that, in some embodiments, when the training data is utilized to train a classification model, the processor 104 may first classify the feature vector into different feature groups according to the sample categories of the training data. The disclosure does not limit the number of sample categories, which may depend on the actual application. After that, the processor 104 may sequentially obtain the training set data and verification set data corresponding to each sample category based on different feature groups one by one. The processor 104 may obtain part of training set data and another part of training set data separately based on the different feature groups.

In some embodiments, the training images include a plurality of first class training images belonging to a first sample category and a plurality of second class training images belonging to a second sample category. In other words, the first class training images are labeled to belong to the first sample category, while the second class training images are labeled to belong to the second sample category.

In some embodiments, the processor 104 may classify the feature vectors into a plurality of first class feature vectors and a plurality of second class feature vectors according to the sample category of each training image. That is, the feature vector of the first class training image is the first class feature vector. The feature vector of the second class training image is the second class feature vector.

In some embodiments, the processor 104 may evaluate the first feature similarity between any two of the first class feature vectors, and evaluate the second feature similarity between any two of the second class feature vectors. Detailed operations for evaluating the similarity of the first feature and the similarity of the second feature may be referred to the foregoing embodiments and will not be described again here.

Afterwards, the processor 104 may select a plurality of first target training images from the first class training images based on the first features similarities associated with each first class feature vector. In addition, the processor 104 may select a plurality of second target training images from a plurality of second class training images based on the second features similarities associated with each second class feature vector. Regarding the detailed operation of selecting the first target training image and the second target training image, please refer to the foregoing embodiments and will not be described again here. Based on this, the training set may include the first target training images belonging to the first sample category and the second target training images belonging to the second sample category.

Figure 9:
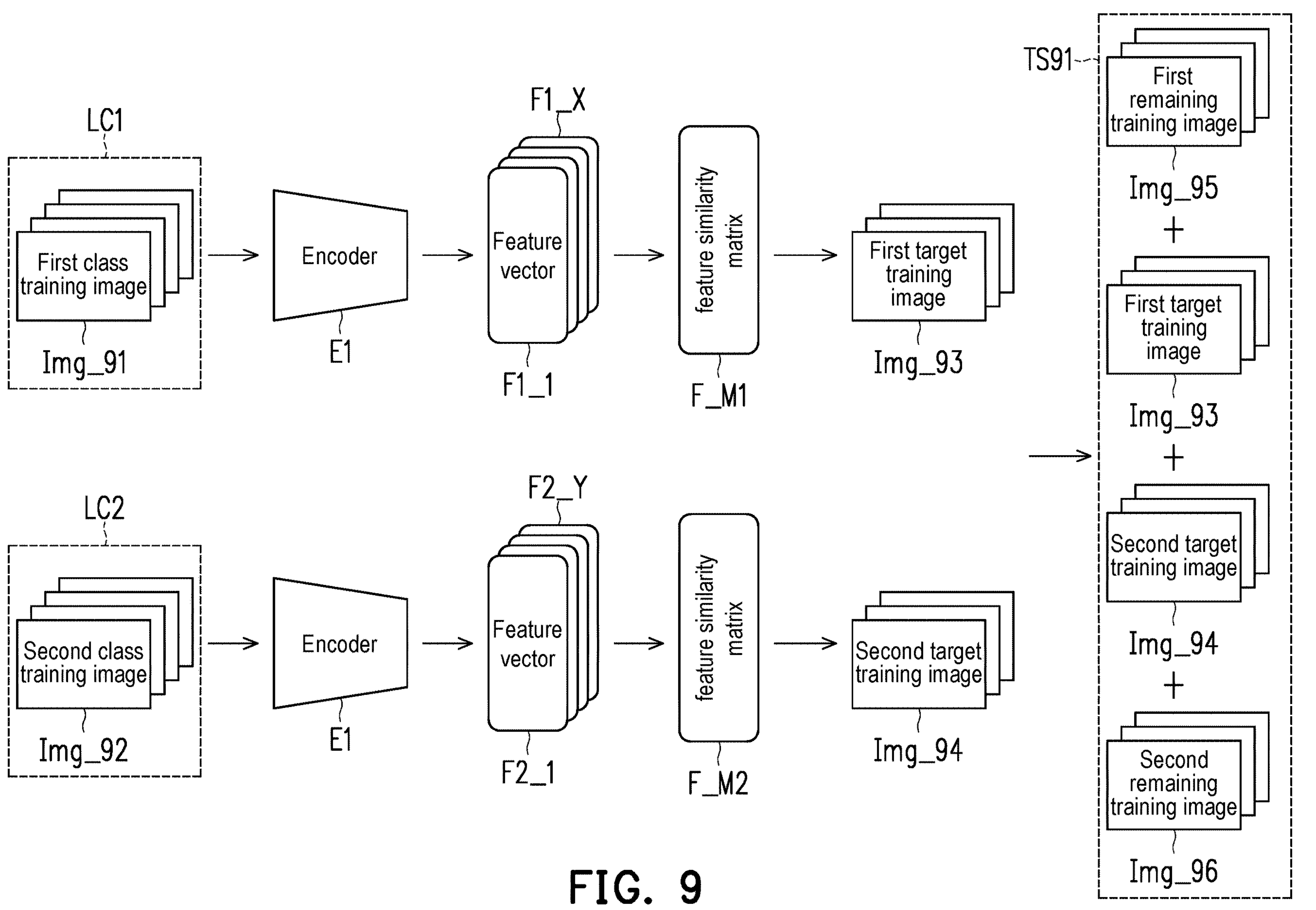
FIG. 9 is a schematic diagram of a training data splitting method according to an embodiment of the disclosure.

For example, FIG. 9 is a schematic diagram of a training data splitting method according to an embodiment of the disclosure. Referring to FIG. 9, the training images include X first class training images Img_91 belonging to the positive sample category LC1 and Y second class training images Img_92 belonging to the negative sample category LC2. In other words, the first class training image Img_91 is labeled and belongs to the positive sample, while the second class training image Img_92 is labeled and belongs to the negative sample.

After that, the processor 104 may input X first class training images Img_91 to encoder E1 sequentially to obtain X first class feature vectors F1_1 to F1_X, and generate a feature similarity matrix F_M1 according to the X first class feature vectors F1_1 to F1_X based on the operation principle shown in FIG. 7. Therefore, the processor 104 may select the first target training images Img_93 from the X first class training images Img_91 according to the feature similarity matrix F_M1. Afterwards, the processor 104 may select the first remaining training image Img_95 through random sampling based on the number of the first target training image Img_93 and the dataset split ratio.

For example, assume that X is 800, the number of first target training images Img_93 is 100, and the dataset split ratio between the training set and the validation set is 7:3. The processor 104 may randomly select 460 first remaining training images Img_95 from the 700 first class training images Img_91 excluding the first target training image Img_93 (i.e., 700=800−100), so as to incorporate the 100 first target training images Img_93 with the 460 the first remaining training image Img_95 in to the training set TS91. In addition, the processor 104 adds the remaining 240 (i.e. 240=800−100−460) first class training images Img_91 to the verification set.

On the other hand, the processor 104 sequentially inputs Y second class training images Img_92 to encoder E1 to obtain Y second feature vectors F2_1 to F2_Y, and generates a feature similarity matrix F_M2 based on the second feature vectors F2_1 to F2_Y according to the principle shown in FIG. 7. Therefore, the processor 104 may select the second target training images Img_94 from Y second class training images Img_92 according to the feature similarity matrix F_M2. Afterwards, the processor 104 may select the second remaining training image Img_96 through random sampling based on the number of the second target training image Img_94 and the dataset split ratio.

For example, assume that Y is 1000, the number of second target training images Img_94 is 120, and the dataset split ratio between the training set and the validation set is 7:3. The processor 104 may randomly select 580 second remaining training images Img_96 from the 880 second class training images Img_92 excluding the second target training image Img_94 (i.e. 880=1000−120), so as to incorporate the 120 second target training images Img_94 and the 580 second remaining training image Img_96 into the training set TS91. In addition, the processor 104 may add the remaining 300 (i.e. 300=1000−120−580) second class training images Img_92 to the validation set.

Therefore, the processor 104 may finally obtain the training set TS91 including the first target training image Img_93, the first remaining training image Img_95, the second target training image Img_94 and the second remaining training image Img_96.

In summary, in the embodiment of the disclosure, the encoder of the pre-trained model may first be utilized to obtain the corresponding feature vector of each training image, and the feature similarity between each feature vector and other feature vectors may be calculated. Based on the feature similarities between each feature vector and other feature vectors, the target training images having unique characteristics may be selected from the training images. Based on this, by incorporating the target training images into the training set, the data diversity of the training set may be effectively increased, thereby improving the generalization ability of the machine learning model, mitigating the risk of overfitting, improving model robustness, and obtaining better learning outcomes. The trained machine learning model may perform well in various application scenarios. In particular, in the field of imaging medicine, where medical images with unique disease characteristics are difficult to obtain, embodiments of the disclosure may effectively allow machine learning models to be trained based on unique disease characteristics, so that the prediction results of the model meet expectations.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the scope of protection of the disclosure is defined by the scope of the appended claims.

What is claimed is:

1. A training data splitting method, comprising:

obtaining training data comprising a plurality of training images;

obtaining a plurality of feature vectors of the training images by using an encoder of a pre-trained model as a feature extractor, wherein the pre-trained model comprises an autoencoder;

evaluating a feature similarity between any two of the feature vectors;

selecting a plurality of target training images from the training images according to the feature similarities associated with each of the of feature vectors; and splitting the training data into a training set comprising the target training images and a validation set, wherein the training set and the validation set are utilized to train a machine learning model, wherein the step of selecting the target training images from the training images according to the feature similarities associated with each of the feature vectors comprises:

calculating a similarity sum of the feature similarities between each feature vector and the other feature vectors;

identifying a plurality of outlier feature vectors from the feature vectors based on the similarity sum corresponding to each of the feature vectors; and selecting the target training images corresponding to the outlier feature vectors from the training images.

2. The training data splitting method according to claim 1, wherein the pre-training model is established based on performing machine learning using a self-supervised learning (SSL) algorithm.

3. The training data splitting method according to claim 1, wherein the step of obtaining the training data comprising the training images comprises:

extracting a testing set from an original training data to obtain the training data excluding the test set.

4. The training data splitting method according to claim 1, wherein after the step of evaluating the feature similarity between any two of the feature vectors, the method further comprises:

performing a normalization process on the feature similarities.

5. The training data splitting method according to claim 1, wherein a comparison result between the similarity sum of each of the outlier feature vectors and a threshold value meets an outlier condition.

6. The training data splitting method according to claim 5, wherein the step of identifying the outlier feature vectors from the feature vectors comprises:

performing a statistical analysis on the similarity sums corresponding to the feature vectors to determine the threshold value for filtering out outliers;

comparing the similarity sum corresponding to each of the feature vectors with the threshold value; and identifying the outlier feature vectors from the feature vectors in response to the comparison results between the similarity sums of the outlier feature vectors and the threshold value meet the outlier condition.

7. The training data splitting method as claimed in claim 5, wherein the outlier condition comprising being greater than the threshold value.

8. The training data splitting method according to claim 1, wherein the step of splitting the training data into the training set comprising the target training images and the validation set comprises:

determining an amount of training data of the training set and an amount of verification data of the validation set according to a dataset split ratio;

selecting a plurality of remaining training images from the training data excluding the target training images according to the amount of training data and the number of the target training images; and incorporating the target training images and the remaining training images into the training set.

9. The training data splitting method according to claim 1, wherein the step of evaluating the feature similarity between any two of the feature vectors comprises:

classifying the feature vectors into a plurality of first class feature vectors and a plurality of second class feature vectors according to a sample category of each of the training images; and evaluating a first feature similarity between any two of the first class feature vectors, and evaluating a second feature similarity between any two of the second class feature vectors.

10. The training data splitting method according to claim 9, wherein the training images comprise a plurality of first class training images belonging to a first sample category and a plurality of second class training images belonging to a second sample category, and the step of selecting the target training images from the training images according to the feature similarities associated with each of the of feature vectors comprises:

selecting a plurality of first target training images from the first class training images according to the first feature similarities associated with each of the first class feature vectors; and selecting a plurality of second target training images from the second class training images according to the second feature similarities associated with each of the second class feature vectors, wherein the training set comprises the first target training images belonging to the first sample category and the second target training images belonging to the second sample category.

11. An electronic device, comprising:

a storage device, configured to store program code; and a processor, coupled to the storage device and configured to accesses the code to:

obtain training data comprising a plurality of training images;

obtain a plurality of feature vectors of the training images by using an encoder of a pre-trained model as a feature extractor, wherein the pre-trained model comprises an autoencoder;

evaluate a feature similarity between any two of the feature vectors;

select a plurality of target training images from the training images according to the feature similarities associated with each of the of feature vectors; and split the training data into a training set comprising the target training images and a validation set, wherein the training set and the validation set are utilized to train a machine learning model, wherein the processor is further configured to:

calculate a similarity sum of the feature similarities between each feature vector and the other feature vectors;

identify a plurality of outlier feature vectors from the feature vectors based on the similarity sum corresponding to each of the feature vectors; and select the target training images corresponding to the outlier feature vectors from the training images.

12. The electronic device according to claim 11, wherein the processor is further configured to:

extract a testing set from an original training data to obtain the training data excluding the test set; and perform a normalization process on the feature similarities.

13. The electronic device according to claim 11, wherein a comparison result between the similarity sum of each of the outlier feature vectors and a threshold value meets an outlier condition.

14. The electronic device according to claim 13, wherein the processor is further configured to:

perform a statistical analysis on the similarity sums corresponding to the feature vectors to determine the threshold value for filtering out outliers;

compare the similarity sum corresponding to each of the feature vectors with the threshold value; and identify the outlier feature vectors from the feature vectors in response to the comparison results between the similarity sums of the outlier feature vectors and the threshold value meet the outlier condition.

15. The electronic device according to claim 13, wherein the outlier condition comprising being greater than the threshold value.

16. The electronic device according to claim 11, wherein the processor is further configured to:

determine an amount of training data of the training set and an amount of verification data of the validation set according to a dataset split ratio;

select a plurality of remaining training images from the training data excluding the target training images according to the amount of training data and the number of the target training images; and incorporate the target training images and the remaining training images into the training set.

17. The electronic device according to claim 11, wherein the processor is further configured to:

classify the feature vectors into a plurality of first class feature vectors and a plurality of second class feature vectors according to a sample category of each of the training images; and evaluate a first feature similarity between any two of the first class feature vectors, and evaluate a second feature similarity between any two of the second class feature vectors.

18. The electronic device according to claim 17, wherein the training images comprise a plurality of first class training images belonging to a first sample category and a plurality of second class training images belonging to a second sample category, and the processor is further configured to:

select a plurality of first target training images from the first class training images according to the first feature similarities associated with each of the first class feature vectors; and select a plurality of second target training images from the second class training images according to the second feature similarities associated with each of the second class feature vectors, wherein the training set comprises the first target training images belonging to the first sample category and the second target training images belonging to the second sample category.

* * * * *